United States Patent
Kim et al.

(10) Patent No.: US 10,201,770 B2
(45) Date of Patent: Feb. 12, 2019

(54) FUEL FILTER FOR VEHICLE

(71) Applicants: Hyundai Motor Company, Seoul (KR); Kia Motors Corporation, Seoul (KR)

(72) Inventors: Chang Han Kim, Gwangju (KR); Myeong Hwan Kim, Hwaseong-si (KR); Jae Min Lee, Gongju-si (KR); Jae Hwa Park, Suwon-si (KR); Jong Sup Choi, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 439 days.

(21) Appl. No.: 14/979,257

(22) Filed: Dec. 22, 2015

(65) Prior Publication Data

US 2016/0361671 A1    Dec. 15, 2016

(30) Foreign Application Priority Data

Jun. 15, 2015    (KR) ........................ 10-2015-0083960

(51) Int. Cl.
*B01D 35/00*    (2006.01)
*B01D 35/30*    (2006.01)
(Continued)

(52) U.S. Cl.
CPC ......... *B01D 35/005* (2013.01); *B01D 27/005* (2013.01); *B01D 27/06* (2013.01); *B01D 27/144* (2013.01); *B01D 29/0095* (2013.01); *B01D 29/15* (2013.01); *B01D 29/52* (2013.01); *B01D 35/30* (2013.01);
(Continued)

(58) Field of Classification Search
CPC .... B01D 35/005; B01D 27/06; B01D 27/005; B01D 27/144; B01D 29/52; B01D 29/0095; B01D 29/15; B01D 35/30; B01D 2201/291; B01D 2201/0415; B01D 2201/32; F02M 37/22
See application file for complete search history.

(56) References Cited

U.S. PATENT DOCUMENTS 5,893,945 A * 4/1999 Hunsinger ......... B01D 46/0004
                                                              55/510
6,053,152 A * 4/2000 Ratner ................... F02M 27/02
                                                              123/538

(Continued)

FOREIGN PATENT DOCUMENTS

JP    2003-514179 A    4/2003
JP       3134873 U     8/2007
(Continued)

*Primary Examiner* — Krishnan S Menon
*Assistant Examiner* — Waqaas Ali
(74) *Attorney, Agent, or Firm* — Morgan, Lewis & Bockius LLP (57) ABSTRACT

A fuel filter for a vehicle may include an upper case with a fuel inlet at a first side; a lower case provided in a structure having a fuel outlet and bonded to a second side of the upper case; and a main filter disposed in an inner space by bonding the upper case and the lower case and filtering fuel, wherein a first auxiliary filter assembly filtering the fuel toward an inner diameter of the main filter is mounted on a first surface of the main filter and a second auxiliary filter assembly filtering the fuel toward a second surface of the main filter is mounted on the second surface of the main filter.

7 Claims, 5 Drawing Sheets

(51) Int. Cl.
- *B01D 29/00* (2006.01)
- *B01D 29/15* (2006.01)
- *B01D 29/52* (2006.01)
- *F02M 37/22* (2006.01)
- *B01D 27/00* (2006.01)
- *B01D 27/06* (2006.01)
- *B01D 27/14* (2006.01)

(52) U.S. Cl.
CPC ..... *F02M 37/22* (2013.01); *B01D 2201/0415* (2013.01); *B01D 2201/291* (2013.01); *B01D 2201/32* (2013.01)

(56) References Cited

U.S. PATENT DOCUMENTS

| | | | |
|---|---|---|---|
| 6,464,870 B1 * | 10/2002 | Castellanos | B01D 29/111 210/243 |
| 6,805,538 B2 * | 10/2004 | Djordjevic | F02M 37/106 137/565.17 |
| 6,968,713 B2 * | 11/2005 | Corrigan | B01D 53/0415 62/474 |
| 7,147,110 B2 | 12/2006 | Clausen et al. | |
| 2014/0151304 A1 * | 6/2014 | Bradford | B01D 35/30 210/660 |

FOREIGN PATENT DOCUMENTS

| | | |
|---|---|---|
| JP | 4445965 B2 | 1/2010 |
| JP | 2010-82543 A | 4/2010 |
| JP | 2013-148055 A | 8/2013 |
| KR | 10-2011-0042947 A | 4/2011 |
| KR | 10-2011-0074283 A | 6/2011 |
| KR | 10-1066153 B1 | 9/2011 |
| KR | 10-2013-0116498 A | 10/2013 |
| KR | 10-1470244 B1 | 12/2014 |
| KR | 101470244 B1 * | 12/2014 |

* cited by examiner

→ FUEL BEFORE FILTERING
--→ FUEL AFTER FILTERING

→ FUEL BEFORE FILTERING
→ FUEL AFTER FILTERING

FUEL FILTER FOR VEHICLE

CROSS-REFERENCE TO RELATED APPLICATION

The present application claims priority to Korean Patent Application No. 10-2015-0083960 filed on Jun. 15, 2015, the entire contents of which is incorporated herein for all purposes by this reference.

BACKGROUND

Field of the Invention

The present disclosure relates to a fuel filter for a vehicle. More particularly, it relates to a fuel filter for a vehicle which can extend an exchange cycle of a fuel filter (particularly, a fuel filter for a flexible fuel vehicle (FFV)).

Description of Related Art

A fuel supply system for a vehicle basically includes a fuel tank storing fuel, a fuel pump conveying the fuel, a fuel filter filtering moisture, dust, and the like in the fuel, a fuel pipe transferring the fuel from the fuel filter to an injector of an engine, and the like.

The fuel filter may filter foreign substances such as moisture, dust, and the like included in the fuel and achieve a normal filtering function only when being exchanged according to a lifespan cycle.

Recently, as a kind of eco-friendly vehicle having a small carbon emission quantity, a so-called flexible fuel vehicle (FFV) using bio ethanol fuel has been manufactured, but the content of foreign substances is high as compared with general gasoline fuel and the frequent exchange of the fuel filter is required.

In the case of the FFV, since moisture, chloride ions, and the like are included in addition to including acid due to deterioration of ethanol fuel, there is a problem in that the lifespan (exchange cycle) of the FFV fuel filter is further shortened.

Therefore, in order to facilitate the frequent exchange of the fuel filter, an external fuel filter in which the fuel filter is mounted on an exterior of the fuel tank is applied to the FFV.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel filter for a vehicle in which first and second auxiliary filter assemblies are further mounted on both sides of a main filter in a fuel filter to allow fuel to be filtered by first and second auxiliary filters in addition to a main filter, thereby achieving an increase in filtering area and extension of a lifespan of the fuel filter.

In one aspect, the present invention provides a fuel filter for a vehicle, including: an upper case with a fuel inlet at one side, a lower case provided in a structure having a fuel outlet and bonded to the other end of the upper case, and a main filter disposed in an inner space by bonding the upper case and the lower case and filtering fuel, wherein a first auxiliary filter assembly filtering the fuel toward an inner diameter of the main filter is mounted on one surface of the main filter and a second auxiliary filter assembly filtering the fuel toward the other surface of the main filter is mounted on the other surface of the main filter.

In an exemplary embodiment, the first auxiliary filter assembly may include an upper plate provided in a structure in which a first fuel through hole being in communication with the inner diameter of the main filter is pierced and bonded to one surface of the main filter, and a first auxiliary filter attached to an outer surface of the upper plate.

In another exemplary embodiment, a first auxiliary filter attachment groove may be formed on the outer surface of the upper plate and multiple support protrusions supporting the first auxiliary filter may integrally protrude on the surface of the first auxiliary filter attachment groove.

In still another exemplary embodiment, the upper plate may be bonded to one surface of the main filter by halogen fusion.

In yet another exemplary embodiment, the second auxiliary filter assembly may include a lower plate having a coupling hole coupled with a fuel outlet of the lower case formed at the center thereof, having a structure in which a plurality of second auxiliary filter attachment holes are formed on the outer periphery of the coupling hole, and bonded to the other surface of the main filter, and a second auxiliary filter attached to the second auxiliary filter attachment hole and facing the other surface of the main filter.

In still yet another exemplary embodiment, the lower plate may be bonded to the other surface of the main filter by the halogen fusion.

In a further exemplary embodiment, the upper case and the lower case may be bonded to each other by thermal fusion.

In another aspect, the present invention provides a fuel filter for a vehicle, including: an upper case with a fuel inlet at one side, a lower case provided in a structure having a fuel outlet and joined with the other end of the upper case, and a main filter disposed in an inner space by bonding the upper case and the lower case and filtering fuel, wherein the fuel filter includes an upper plate bonded to one surface of the main filter and having a fuel through hole at the center, a lower plate bonded to the other surface of the main filter and having the fuel through hole at the center, and an auxiliary filter attached to an outer surface of the upper plate or lower plate.

Through the aforementioned problem solving means, the present invention provides the following effects.

First, the first and second auxiliary filters are further mounted on both sides of the main filter embedded in the fuel filter to allow the fuel to be filtered by the first and second auxiliary filters in addition to the main filter, thereby increasing the filtering area of the fuel filter, and as a result, the extension of the lifespan of the fuel filter can be achieved.

Second, since the first and second auxiliary filters are mounted on both sides of the main filter in the fuel filter, the filtering area of the fuel filter can be easily increased without increasing an exterior size of the fuel filter.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has at least two sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Herein, a configuration and an operation flow for the external fuel filter in the related art will be described below.

Figure 1:
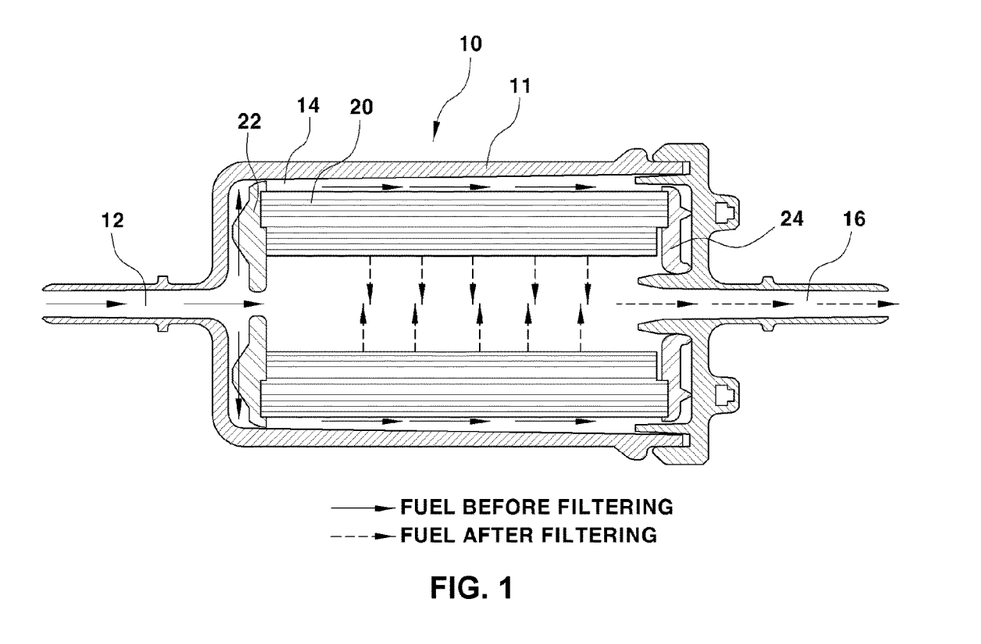
FIG. 1 is a cross-sectional view illustrating a fuel filter and a filtering process thereof in the related art.

FIG. 1 is a cross-sectional view illustrating a fuel filter and a filtering operation thereof in the related art.

In FIG. 1, reference numeral 11 represents a housing of a fuel filter 10 and reference numeral 20 represents a main filter embedded in the housing.

The housing 11 is molded in a cylindrical shape, a fuel inlet 12 is formed at a front end of the housing and a fuel outlet 16 is formed at a rear end of the housing.

The main filter 20 has a cylindrical shape and a structure in which an upper cover 22 and a lower cover 24 are coupled with the front end and the rear end, respectively.

In this case, a space between the inner wall of the front end of the housing 11 and the upper cover 22 of the main filter 20 and a space between an inner diameter surface of the housing 11 and an outer diameter surface of the main filter 20 form a fuel flow space 14 in which fuel flows before filtering.

Accordingly, the fuel before filtering which is introduced through the fuel inlet 12 of the housing 11 flows to the fuel flow space 14 and then is filtered by the main filter 20, and the filtered fuel is discharged to the engine through the fuel outlet 16 via the inner diameter space of the main filter 20.

However, the fuel filter in the related art has the following problems.

First, as only circumferential filtering that filters the fuel from an outer diameter to an inner diameter of the main filter is achieved, there is a limit in fuel filtering area of the fuel filter.

Second, in the case of the ethanol fuel used in the FFV, since the content of foreign substances is high as compared with general gasoline fuel, a blocking phenomenon of the fuel filter frequently occurs due to the limit in filtering area of the fuel filter, and as a result, there is a problem in that the fuel filter is frequently exchanged.

The above information disclosed in this Background section is only for enhancement of understanding of the background of the invention and therefore it may contain information that does not form the prior art that is already known in this country to a person of ordinary skill in the art.

Hereinafter, an exemplary embodiment of the present invention will be described in detail with reference to the accompanying drawings.

Figure 2:
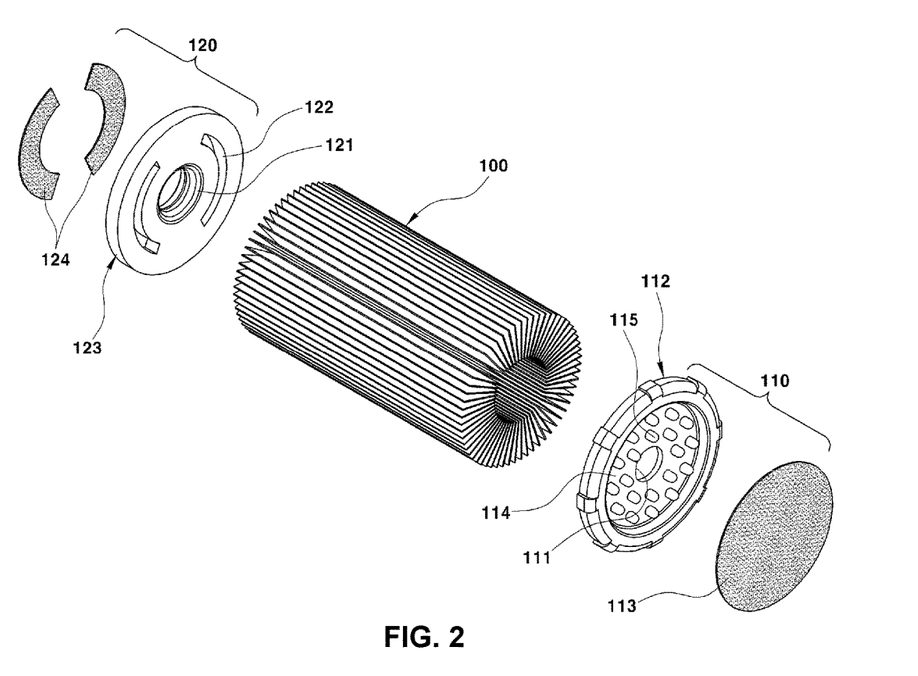
FIG. 2 and FIG. 3 are exploded perspective views illustrating a fuel filter according to an exemplary embodiment of the present invention.
Figure 3:
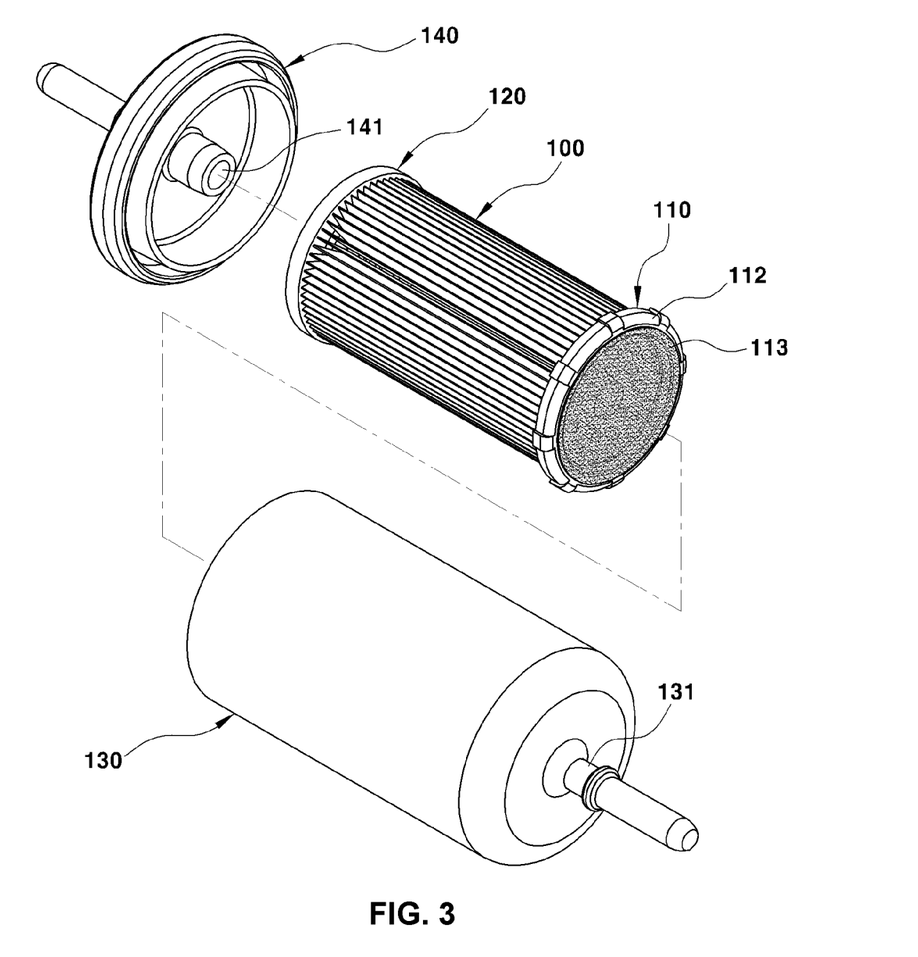
Figure 4:
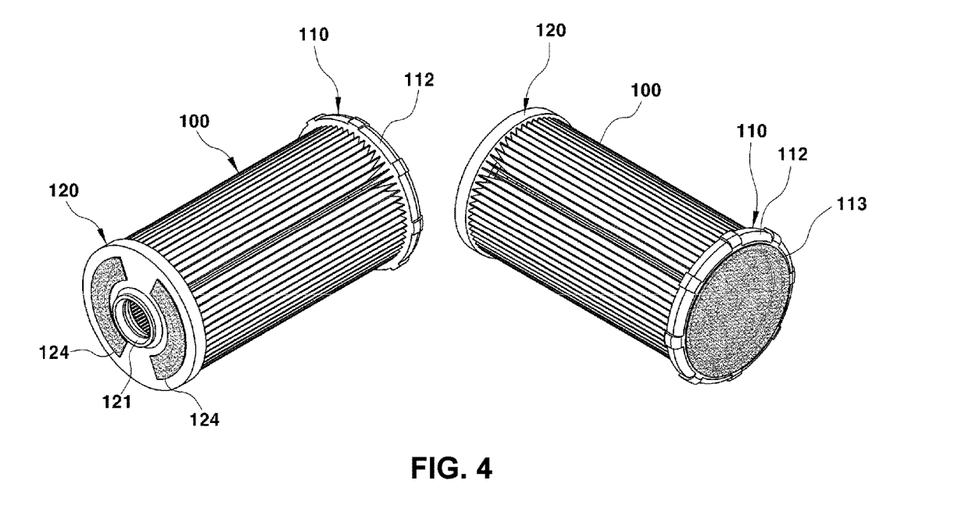
FIG. 4 is an assembly perspective view illustrating the fuel filter according to an exemplary embodiment of the present invention.

FIGS. 2 and 3 are exploded perspective views illustrating a fuel filter for a vehicle according to an exemplary embodiment of the present invention and FIG. 4 illustrates an assembly perspective view.

In FIGS. 2 to 4, reference numeral 100 represents a main filter.

The main filter 100 which has a cylindrical structure serves to filter fuel when the fuel flows from an outer diameter part to an inner diameter part.

According to an exemplary embodiment of the present invention, a first auxiliary filter assembly 110 that filters the fuel toward an inner diameter of the main filter 100 is mounted on one surface of the main filter 100 and further, a second auxiliary filter assembly 120 that filters the fuel toward the other surface of the main filter 100 is mounted on the other surface of the main filter 100.

Therefore, in addition to circumferential filtering in which the fuel flows from the outer diameter part to the inner diameter part of the main filter 100, linear filtering in which the fuel is filtered through first and second auxiliary filter assemblies 110 and 120 is simultaneously achieved to increase a filtering area of the fuel filter.

The first auxiliary filter assembly 110 includes an upper plate 112 having a structure in which a first fuel through-hole 111 being in communication with the inner diameter part of the main filter 100 is pierced and attached to one surface of the main filter 100 and a first auxiliary filter 113 attached to an outer surface of the upper plate 112.

In more detail, the upper plate 112 has a disk type structure and is provided in a structure in which the first fuel through hole 111 being in communication with the inner diameter part of the main filter 100 is pierced at the center of the upper plate 112 and a first auxiliary filter attachment groove 114 having a predetermined depth, to which the first auxiliary filter 113 is bonded is formed on the outer surface of the upper plate 112.

In particular, multiple support protrusions 115 that support the first auxiliary filter 113 integrally protrude on the surface of the first auxiliary filter attachment groove 114 and the support protrusions 115 serve to evenly support the entire surface of the first auxiliary filter 113 in order to prevent the first auxiliary filter 113 from being bent or damaged in a fuel flowing direction by fuel pressure applied to the first auxiliary filter 113.

In this case, the inner surface of the upper plate 112 is bonded to one surface of the main filter 100 by halogen fusion, and as a result, the first auxiliary filter assembly 110 is mounted on the main filter 100.

The second auxiliary filter assembly 120 has, as a framework, a lower plate 123 including a coupling hole 121 for coupling with a lower case 140 and a plurality of second auxiliary filter attachment holes 122 for attaching the second auxiliary filter 124.

In more detail, the lower plate 123 has a coupling hole 121 coupled with a fuel outlet 141 of the lower case 140 at the center thereof and has a disk type structure in which the plurality of second auxiliary filter attachment holes 122 having a fan shape is pierced on the outer periphery of the coupling hole 121.

In this case, since the second auxiliary filter 124 is attached to the second auxiliary filter attachment hole 122 of the lower plate 123, the second auxiliary filter 124 faces the other surface of the main filter 100.

Preferably, the inner surface of the lower plate 123 is bonded to the other surface of the main filter 100 by the halogen fusion, and as a result, the second auxiliary filter assembly 120 is mounted on the main filter 100.

Herein, the first auxiliary filter assembly 110 and the second auxiliary filter assembly 120 mounted on both surfaces of the main filter 100 are embedded in the upper case 130 and the lower case 140 which are housing components of the fuel filter in addition to the main filter 100.

A fuel inlet 131 into which the fuel from the fuel tank flows is formed at one side of the upper case 130, and a quick connector of a fuel supply hose extended from the fuel tank is fastened to the fuel inlet 101.

The fuel outlet 141 through which filtered fuel is discharged is formed at one side of the lower case 140 and a quick connector of a fuel discharge hose which supplies the filtered fuel to the engine is fastened to the fuel outlet 141.

Accordingly, the fuel outlet 141 of the lower case 140 fits in the coupling hole 121 formed in the lower plate 123 of the second auxiliary filter assembly 120 and thereafter, the other end of the upper case 130 is bonded onto the inner surface of the lower case 140 by thermal fusion, and as a result, the first auxiliary filter assembly 110 and the second auxiliary filter assembly 120 mounted on both surfaces of the main filter 100 are embedded in addition to the main filter in the upper case 130 and the lower case 140 while the upper case 130 and the lower case 140 are bonded to each other.

In this case, a separation space for a fuel flow is formed between the outer diameter part of the main filter 100 and an inner wall of the upper case 130, and fuel supplied to the separation space has a flow in which the fuel is filtered from the outer diameter part to the inner diameter part of the main filter 100.

The first auxiliary filter assembly 110 serves to auxiliarily filter the fuel between the inner wall of the upper case 130 and one surface of the main filter 100.

The second auxiliary filter assembly 120 serves to auxiliarily filter the fuel between the other surface of the main filter 100 and the inner wall of the lower case 140.

Herein, a fuel filtering process by the fuel filter of the present invention configured as above will be described below.

Figure 5:
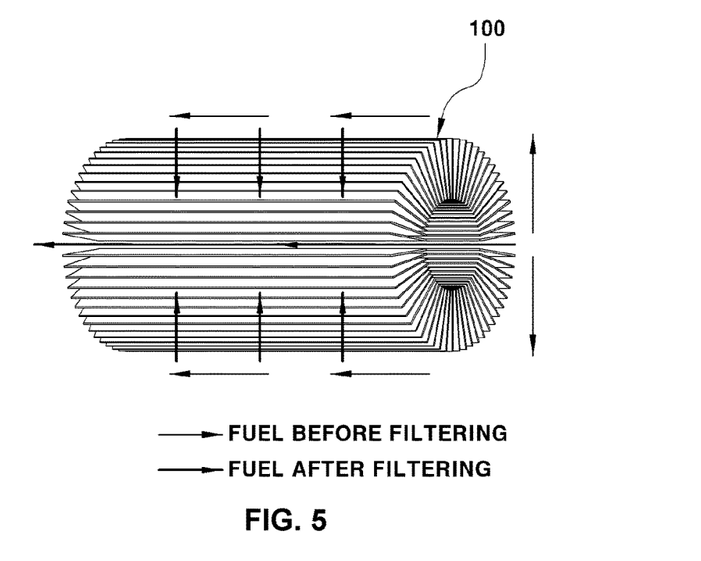
FIG. 5 is a cross-sectional view illustrating a filtering process of a main filter embedded in the fuel filter according to an exemplary embodiment of the present invention.

FIG. 5 is a cross-sectional view illustrating a filtering process of the main filter embedded in the fuel filter according to an exemplary embodiment of the present invention.

As illustrated in FIG. 5, when the fuel from the fuel tank is first introduced through the fuel inlet 131 of the upper case 130, passes through the first auxiliary filter assembly 110, and reaches between the inner surface of the upper case 130 and the outer diameter of the main filter 100, the fuel is filtered while flowing from the outer diameter to the inner diameter of the main filter 100.

Next, the fuel filtered by the main filter 100 is discharged to the engine through the fuel outlet 141 of the lower case 140.

Figure 6:
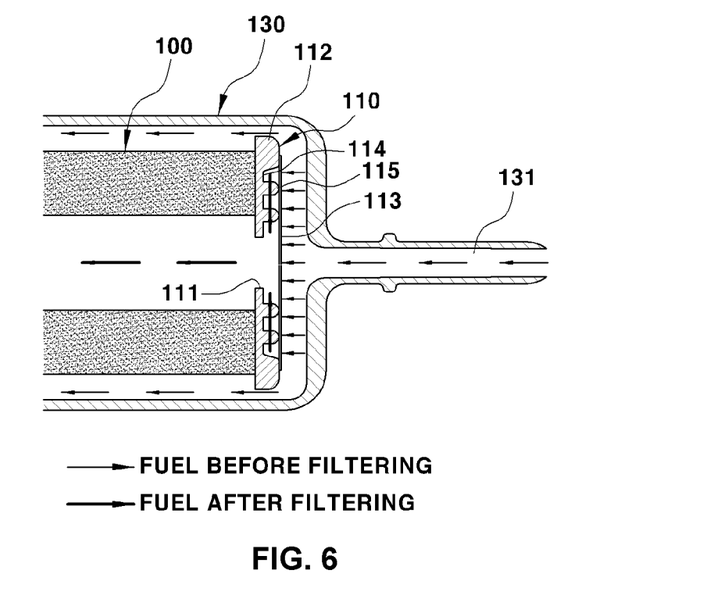
FIG. 6 is a cross-sectional view illustrating a filtering process of a first auxiliary filter embedded in the fuel filter according to an exemplary embodiment of the present invention.

FIG. 6 is a cross-sectional view illustrating a filtering process of the first auxiliary filter embedded in the fuel filter according to an exemplary embodiment of the present invention.

As illustrated in FIG. 6, the fuel from the fuel tank is introduced through the fuel inlet 131 of the upper case 130 and thereafter, flows toward the inner diameter of the main filter 100 by passing through the first fuel through hole 111 of the upper plate 112 while being filtered by the first auxiliary filter 113 of the first auxiliary filter assembly 110.

In this case, although the pressure of the fuel for filtering is applied to the outer surface of the first auxiliary filter 113, the support protrusions 115 formed on the surface of the first auxiliary filter attachment groove 114 of the upper plate 112 support the first auxiliary filter 113, and as a result, it is possible to easily prevent the first auxiliary filter 113 from being bent or damaged in the fuel flowing direction.

Next, the fuel that is filtered by the first auxiliary filter 113 and thereafter, flows toward the inner diameter of the main filter 100 is discharged to the engine through the fuel outlet 141 of the lower case 140.

Figure 7:
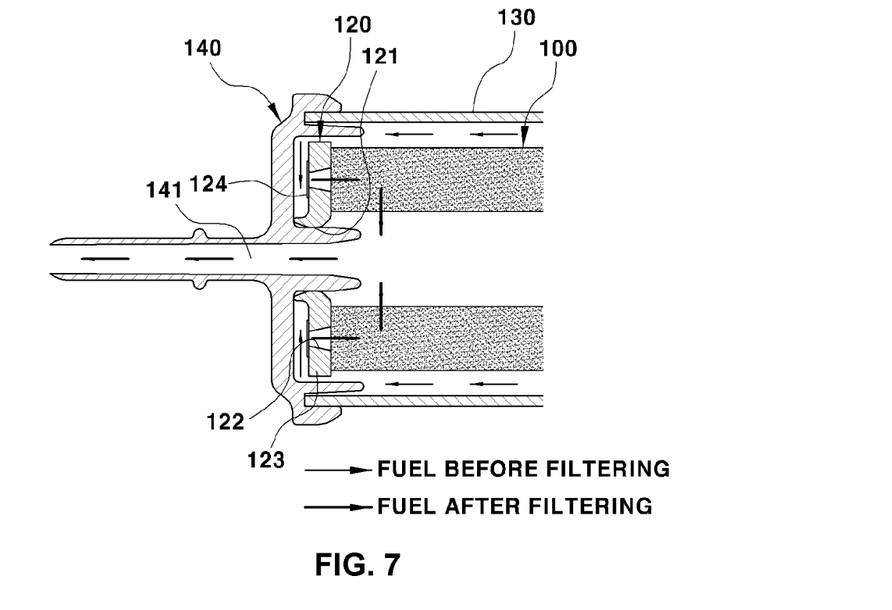
FIG. 7 is a cross-sectional view illustrating a filtering process of a second auxiliary filter embedded in the fuel filter according to an exemplary embodiment of the present invention.

FIG. 7 is a cross-sectional view illustrating a filtering process of the second auxiliary filter embedded in the fuel filter according to an exemplary embodiment of the present invention.

As illustrated in FIG. 7, when the fuel from the fuel tank is introduced through the fuel inlet 131 of the upper case 130, passes through the first auxiliary filter assembly 110 and the main filter 100, and reaches between the inner surface of the upper case 130 and the outer surface of the second auxiliary filter 124, the fuel is filtered by the second auxiliary filter 124 and thereafter, enters the main filter 100

In this case, since the fuel that is filtered by the second auxiliary filter 124 and thereafter, enters the other surface of the main filter 100 is already filtered by the second auxiliary filter 124, even though the fuel enters the main filter 100, the fuel does not contaminate the main filter 100.

Next, the fuel that is filtered by the second auxiliary filter 124 is discharged to the engine through the fuel outlet 141 of the lower case 140 by passing through the inner diameter part of the main filter 100.

As such, since the fuel from the fuel tank is filtered by the first auxiliary filter 113 and the second auxiliary filter 124 in addition to the main filter 100, a filtering area of the fuel filter filtering the fuel may be increased and a lifespan of the fuel filter may be extended by increasing the filtering area.

Meanwhile, although the structure in which both the first and second auxiliary filters are mounted has been described in the exemplary embodiment of the present invention, it is disclosed that even a structure in which only one auxiliary filter is mounted onto the outer surface of the upper plate or lower plate in addition to the main filter disposed in an inner space by bonding the upper case and the lower case and filtering the fuel is included in the scope of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel filter for a vehicle, comprising:
   an upper case with a fuel inlet at a first side;
   a lower case having a fuel outlet and bonded to a second side of the upper case; and
   a main filter having a cylindrical shape and disposed in an inner space of the upper case by bonding the upper case and the lower case and configured for filtering fuel,
   wherein a first auxiliary filter assembly filtering the fuel toward an inner diameter of the main filter is mounted on a first surface of the main filter and a second auxiliary filter assembly filtering the fuel toward a second surface of the main filter is mounted on the second surface of the main filter, and
   wherein the second auxiliary filter assembly includes:
      a lower plate having a coupling hole coupled with the fuel outlet of the lower case formed at the center thereof, in which a plurality of second auxiliary filter attachment holes having a fan shape are formed on an outer periphery of the coupling hole and a portion of the lower plate is bonded to the second surface of the main filter, and
      a second auxiliary filter having a fan shape attached to the second auxiliary filter attachment holes and facing the second surface of the main filter.

2. The fuel filter of claim 1, wherein the first auxiliary filter assembly includes:
   an upper plate provided in which a first fuel through hole being in communication with the inner diameter of the main filter is pierced and bonded to the first surface of the main filter, and
   a first auxiliary filter attached to an outer surface of the upper plate.

3. The fuel filter of claim 2, wherein a first auxiliary filter attachment groove is formed on the outer surface of the upper plate and a plurality of support protrusions supporting the first auxiliary filter integrally protrude on a surface of the first auxiliary filter attachment groove.

4. The fuel filter of claim 2, wherein the upper plate is bonded to the first surface of the main filter by halogen fusion.

5. The fuel filter of claim 1, wherein the lower plate is bonded to the second surface of the main filter by halogen fusion.

6. The fuel filter of claim 1, wherein the upper case and the lower case are bonded to each other by thermal fusion.

7. The fuel filter of claim 1, wherein an outer diameter of the lower plate is smaller than an inner diameter of the upper case and the lower plate is spaced from the lower case and the portion of the lower plate is bonded to the second surface of the main filter to form a fluid passage between the second auxiliary filter attachment holes and a space formed between an inner circumference of the upper case, the lower plate, and the lower case.

* * * * *